United States Patent Office 3,078,360
Patented Feb. 19, 1963

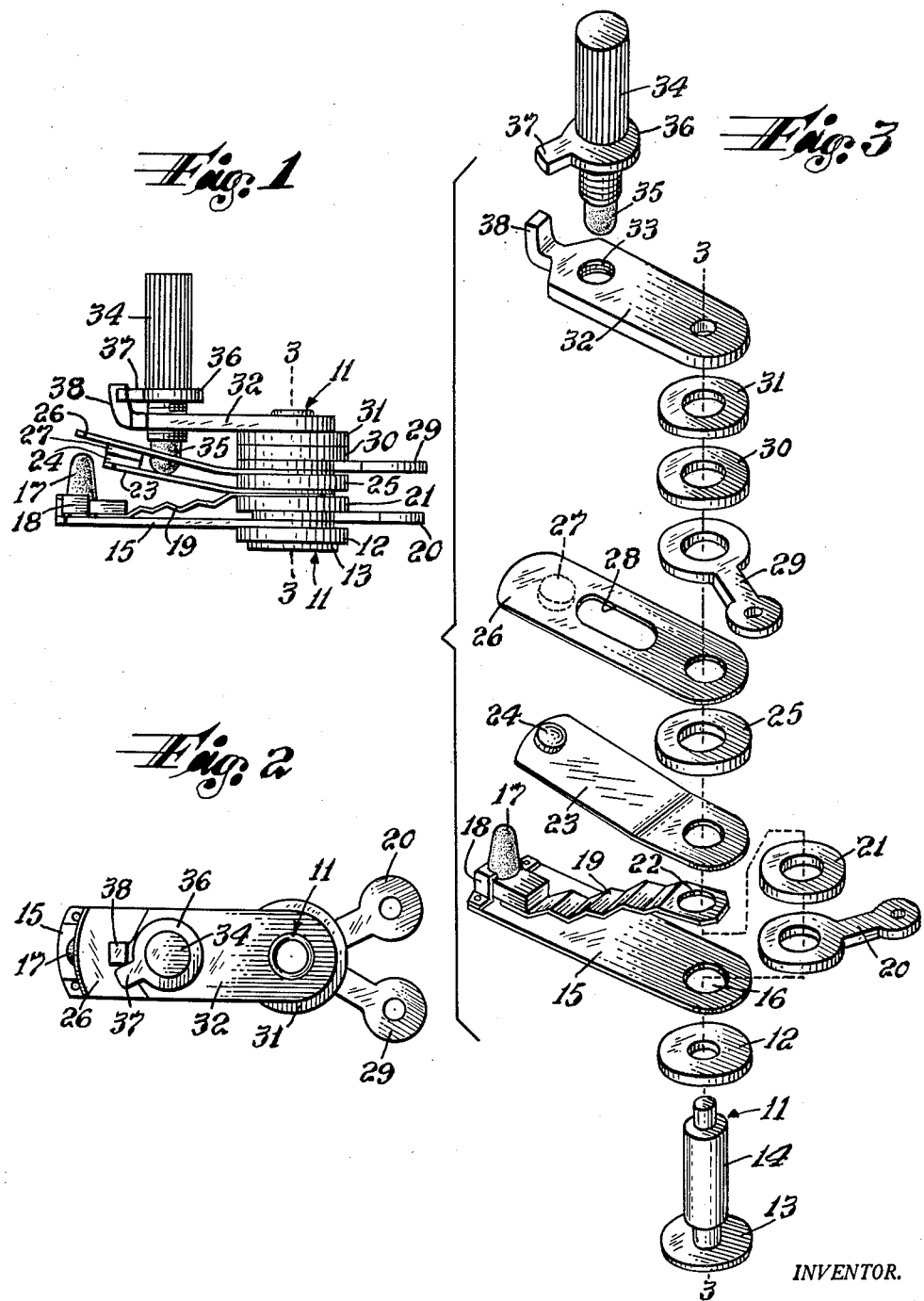

3,078,360
ELECTRICAL THERMOSTATIC SWITCH
Herman Ulanet 473 Richmond Ave., Maplewood
Township, Essex County, N.J.
Filed Nov. 23, 1960, Ser. No. 71,236
3 Claims. (Cl. 200—122)

My invention relates generally to thermostats and specifically to an electrical, thermostatic switch employing an externally heated, thermo-sensitive bimetal adapted to anticipate temperature changes to open and close with minimal thermal override.

In flat irons and like electrical appliances, it is almost universal practice to provide a relatively simple, bimetal thermostat to control the temperature. In such thermostats the bimetal is physically connected to the surface of the body the temperature of which is to be controlled. The thermostat is electrically connected in series to a resistance heating element and is normally closed, opening only when a preadjusted temperature has been attained. However, such thermostats do not respond quickly enough to temperature changes with the result that there are extreme fluctuations in the temperature of the heated surface due to excessive thermal override. The problem becomes more acute when dealing with relatively high temperatures such as found in a flat iron and are particularly acute when first heating or when changing the temperature setting by a substantial degree. The slow response of such thermostats and the resultant thermal override and widely fluctuating temperatures are due to a number of factors inherent in their structure and operation including slow and inefficient heat transfer from the heated surface to the bimetal and excessive heat loss by radiation from exposed surfaces of the bimetal. These two factors can be overcome by supplying heat directly to the bimetal from an external source which is actuated by the current passing through the thermostat when closed. Such a thermostat therefore, anticipates changes in surface temperature and transmits heat directly to the bimetal immediately upon closing of the thermostatic surface to insure a rapid and accurate response.

Therefore, it is among the objects and advantages of my invention to provide an electrical thermostatic switch which anticipates changes in temperature.

Another object of my invention is to provide an electrical thermostatic switch which responds quickly and efficiently to temperature changes thereby minimizing thermal override and resultant uneven and widely fluctuating operating temperatures.

A further object of my invention is to provide an electrical thermostatic switch which accurately and efficiently controls the temperature of the detected body within the very narrow open and close limits of the thermostat itself.

Yet another object of my invention is to provide an electrical thermostatic switch in which heat is supplied directly to a bimetal from a source operated by electricity passing through an external heater when the thermostat is closed.

A still further object of my invention is to provide an electrical thermostatic switch which may employ easily fabricated and inexpensive parts which are presently staple items in the industry.

These objects and advantages as well as other objects and advantages may be achieved by my invention one embodiment of which is illustrated in the drawings in which:

FIGURE 1 is a side elevational view of my electrical switch assembly.

FIGURE 2 is a top plan view of the electrical thermostatic switch illustrated in FIGURE 1.

FIGURE 3 is a view in perspective exploded along axis 3—3 in FIGURE 1.

Referring now to the drawings in detail, my electrical thermostatic switch comprises an elongated, flat headed, tubular rivet 11 on which other members of the thermostat are mounted. An annular, insulating washer 12 is mounted on the rivet 11 abutting against its head 13. Mounted on the rivet 11 above the washer 12 is a tubular, ceramic, mounting insulator 14 on which is mounted a number of elements of the thermostat. Mounted on the ceramic insulator 14 above the washer 12, is a thermal-sensitive bimetalic strip 15, the high expansion side of which abuts the washer 12. The bimetalic strip 15 is provided with a hole 16 at one end to facilitate mounting on the ceramic insulator 14 and an electrically non-conductive ceramic tip 17 at its opposite end. The tip 17 may be secured to the bimetal 15 by a tap welded bracket 18.

A relatively thin, electrically conductive resistance heater 19 is electrically connected to the bimetal 15 beneath the tip 17 by some suitable means such as a tap weld. The heater may be flat or corrugated or any other convenient configuration and extends at an angle upwardly towards the insulator 14.

A terminal 20 is mounted on the insulator 14 immediately above the bimetal 15 and is electrically connected thereto. The terminal 20 is tap welded to the bimetal 15 in order to maintain its angular orientation as illustrated in the drawing. An annular insulating spacer 21 is mounted on the tubular insulator 14 immediately above the terminal 20.

The end of the heater 19 opposite the ceramic tip 17 is provided with a hole 22 to facilitate mounting it on the insulator 14 immediately above the spacer 21. A resilient, electrically conductive, lower spring 23 is mounted on the insulator 14 immediately above the heater 19 and is electrically connected thereto. The lower spring 23 is bent upwardly and its upper, outer end is provided with an electrically conductive contact 24. The lower spring 23 is shorter than the bimetal 15 so that the ceramic tip 17 extends upwardly from the bimetal 15 past the end of the spring 23.

An electrically insulating, annular spacer 25 is mounted on the insulator 14 immediately above the lower spring 23. A resilient, electrically conductive, upper spring 26 is mounted on the insulator 14 immediately above the spacer 25. The lower surface of the upper spring 26 is provided with an electrically conductive contact 27 positioned in opposition to the contact 24 on the upper surface of the lower spring 23. The upper spring 26 is provided with an elongated opening 28 intermediate the contact 26 and the mounting insulator 14. An upper, electrically conductive terminal 29 is mounted on the insulator 14 immediately above the upper spring 26. The terminal 29 is electrically connected to the upper spring 26 and is tap welded thereto to preserve its angular orientation as illustrated in the drawings. The displaced, angular orientation of the upper terminal 29 and lower terminal 20 facilitates connecting them to electrical leads and minimizes the possibility of short circuit.

Mounted on the insulator 14 immediately above the upper terminal 29 are a pair of annular, electrically insulating, spacers 30, 31. The insulator 14 terminates at the upper spacer 31. A bracket 32 is mounted on the rivet 11 immediately above the upper spacer 31. The bracket 32 is provided with a threaded hole 33 the vertical axis of which passes through the opening 28 in the upper spring 26. An adjustment screw 34 is threadably engaged within the hole 33. The bottom of the adjustment screw 34 is provided with an electrically non-conductive ceramic post 35 which projects downwardly through the opening 28 in the upper spring 26 to engage the lower spring 23 intermediate the contact 24 and the mounting insulator 14.

The adjustment screw 34 is provided with an annular collar 36 having a radial leg 37. The radial leg 37 is adapted to engage an upturned projection 38 formed integrally on the end of the bracket 32 opposite the mounting rivet 11. The radial leg 37 and upturned projection 38 are adapted to cooperate to limit rotation of the adjustment screw to less than 360 degrees. The rivet 11 is deformed over the upper surface of the bracket 32 to secure the various members mounted thereon in place.

In operation, the terminals 20, 29 of the thermostat are connected in series with an electrical, resistance heating element heating the body the temperature of which is to be detected and controlled. The bimetal 15 is physically engaged to the body the temperature of which is to be detected and controlled. The current proceeds through the thermostat from the lower terminal 20 to the bimetal 15; from the bimetal 15 through the heater 19 to the lower spring 23 and the contact 24. If the thermostat is closed, contact 24 will be engaged with contact 26 and the current will pass therethrough to the upper spring 26 and upper terminal 29 thus completing the circuit. The mounting rivet 11, the bracket 32 and the adjustment screw 34 are electrically insulated from the circuit by the ceramic insulator 14, the spacers 12, 30, 31 and the ceramic post 35. The upper spring 26 and the lower spring 23 are electrically insulated from each other by the ceramic insulator 14 and the spacer 25.

The temperature at which the thermostat will open may be adjusted by the adjustment screw 34. Rotation of the adjustment screw causes the lower spring 23 to move upwardly or downwardly in response to or in opposition to its own normal resilience. This sets the level at which the contacts 24 and 27 will be engaged. As the temperature of the bimetal 15 rises, it bends upwardly so that the ceramic tip 17 will engage the end of the upper spring 26 bending it upwardly to disengage the contacts and break the circuit.

In the usual thermostat of this general construction, there is an inordinate time delay in the response of the bimetal to changes in temperature of the body detected. This causes the body to overheat before the thermostat opens. The net result is an uneven, widely fluctuating temperature. I have solved this problem of thermal override by the expedient of the heater 19. The heater 19 is electrically connected in series to the circuit passing through the thermostat. When the circuit is closed, the heater 19 is energized radiating heat directly to the bimetal 15. This added heat applied only when the thermostat has closed causes the bimetal 15 to anticipate the temperature change in the detected body. Thus, the bimetal 15 responds quickly and efficiently to temperature changes thereby maintaining a close relationship between actual body temperature and thermostat setting and eliminating thermal override.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:
1. An electrical thermostatic switch comprising,
   mounting means,
   a thermosensitive bimetallic element mounted on the mounting means but electrically insulated therefrom,
   a lower, electrically conductive spring mounted on the mounting means above the bimetallic element, the lower spring being electrically insulated from the bimetallic element and mounting means at the mounting means,
   an upper, electrically conductive spring mounted on the mounting means above the lower spring, the upper spring being electrically insulated from the lower spring and the mounting means,
   a contact member on the lower spring,
   a contact member on the upper spring opposite the contact member on the lower spring,
   electrically non-conductive means secured to the bimetallic means adapted to engage the upper spring,
   an electrical resistance heater having one end mounted on and electrically connected to the upper surface of the bimetallic element at its end opposite the mounting means and the opposite end mounted on the mounting means and electrically connected to the lower spring, the said heater extending between the said end of the bimetallic element and the mounting means in relatively close, heat radiating proximity to the bimetallic element,
   terminal means connected to the bimetallic element, and
   terminal means connected to the upper spring.

2. An electrical thermostatic switch comprising,
   mounting means,
   a thermosensitive bimetallic strip mounted on the mounting means but electrically insulated therefrom, the said strip adapted to bend upwardly in response to an increase in temperature,
   a lower, electrically conductive spring mounted on the mounting means above the bimetallic strip, the lower spring being electrically insulated from the bimetallic strip and the mounting means at the mounting means,
   an upper, electrically conductive spring mounted on the mounting means above the lower spring, the upper spring being insulated from the lower spring and the mounting means,
   a contact member on the lower spring,
   a contact member on the upper spring opposite the contact member on the lower spring,
   electrically non-conductive means secured to the bimetallic strip adapted to engage the upper spring as the said strip bends upwardly in response to an increase in temperature,
   an electrical resistance heater having one end mounted on and electrically connected to the upper surface of the bimetallic strip at its end opposite the mounting means and the opposite end mounted on the mounting means and electrically connected to the lower spring, the said heater extending between the said end of the bimetallic strip and the mounting means in relatively close, heat radiating proximity to the bimetallic strip,
   terminal means connected to the bimetallic element,
   terminal means connected to the upper spring, and
   vertically movable means mounted on the mounting means and adapted to engage the lower spring.

3. An electrical thermostatic switch comprising,
   a mounting rivet having a head formed thereon,
   an annular, electrically insulating washer mounted on the rivet at its head,
   a tubular, electrically non-conductive, mounting insulator mounted on the rivet above the insulating washer,
   a thermosensitive bimetallic strip mounted on the tubular insulator above the washer, the bimetallic strip being adapted to bend upwardly in response to increases in temperature,
   a first terminal mounted on the tubular insulator above the bimetallic strip and electrically connected thereto,
   a first, electrically insulating spacer mounted on the tubular insulator above the first terminal,
   an electrical resistance heater having one end mounted on and electrically connected to the upper surface of the bimetallic strip at its end opposite the tubular insulator and the opposite end mounted on the tubular insulator and electrically connected to the lower spring, the said heater extending between the said end of the bimetallic strip and the tubular insulator in relatively close, heat radiating proximity to the bimetallic strip, a resilient, electrically conductive, lower spring mounted on the tubular insulator above the resistance heater and electrically connected thereto, a second, electrically insulating spacer mounted on the tubular insulator above the lower spring, a resilient, electrically conductive, upper spring mounted on the tubular insulator above the second spacer, the upper spring being longer than the lower spring, and having an opening intermediate its ends, a contact member on the lower spring, a contact member on the upper spring opposite the contact member on the lower spring, a second terminal mounted on the tubular insulator above the upper spring and electrically connected thereto, a third, electrically insulating spacer mounted on the tubular insulator above the second terminal, a bracket mounted on the rivet above the third spacer, the rivet being deformed to maintain the bracket in position, an adjustment screw threadably engaged to the bracket above the opening in the upper spring, an electrically non-conductive post secured to the lower end of the adjustment screw and depending downwardly through the opening in the upper spring to engage the lower spring, and an upwardly extending, electrically non-conductive tip secured to the end of the bimetallic strip opposite the tubular insulator, the said tip adapted to engage the end of the upper spring opposite the tubular insulator as the bimetallic strip bends upwardly in response to an increase in temperature.

References Cited in the file of this patent

UNITED STATES PATENTS

| | | |
|---|---|---|
| 2,199,638 | Lee | May 7, 1940 |
| 2,753,437 | Mertler | July 3, 1956 |
| 2,768,263 | Callihan | Oct. 23, 1956 |
| 2,805,302 | Reis | Sept. 3, 1957 |
| 2,806,106 | Mertler | Sept. 10, 1957 |
| 2,854,548 | Cassidy | Sept. 30, 1958 |

FOREIGN PATENTS

| | | |
|---|---|---|
| 651,051 | Great Britain | Mar. 7, 1951 |